(12) United States Patent
Calendrille, Jr.

(10) Patent No.: US 10,005,519 B2
(45) Date of Patent: Jun. 26, 2018

(54) BICYCLE DERAILLEUR

(71) Applicant: TEKTRO TECHNOLOGY CORPORATION, Changhua County (TW)

(72) Inventor: John Calendrille, Jr., Port Jefferson, NY (US)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 259 days.

(21) Appl. No.: 15/192,160

(22) Filed: Jun. 24, 2016

(65) Prior Publication Data

US 2016/0375959 A1 Dec. 29, 2016

Related U.S. Application Data

(60) Provisional application No. 62/231,074, filed on Jun. 25, 2015.

(51) Int. Cl.
*B62M 9/1242* (2010.01)
*B62M 9/124* (2010.01)

(52) U.S. Cl.
CPC .......... *B62M 9/1242* (2013.01); *B62M 9/124* (2013.01)

(58) Field of Classification Search
CPC .. B62M 9/1242; B62M 9/124; B62M 9/1244; B62M 9/134; B62M 9/127
See application file for complete search history.

(56) References Cited

U.S. PATENT DOCUMENTS

| | | | | |
|---|---|---|---|---|
| 2013/0130853 A1* | 5/2013 | Bohm et al. | ........... | B62M 9/124 474/80 |
| 2014/0371013 A1* | 12/2014 | Yamaguchi | .......... | B62M 9/1244 474/122 |
| 2016/0107724 A1* | 4/2016 | Bao | ....................... | B62M 9/1242 474/82 |
| 2017/0283004 A1* | 10/2017 | Calendrille | ............ | B62M 9/127 |
| 2017/0334518 A1* | 11/2017 | Bortoli | ................... | B62M 9/134 |

* cited by examiner

*Primary Examiner* — William E Dondero
*Assistant Examiner* — Robert T Reese
(74) *Attorney, Agent, or Firm* — Maschoff Brennan

(57) ABSTRACT

A bicycle derailleur includes movable member, chain guide member and resistance applying member. The movable member is connected to linkage assembly. The chain guide member is pivoted to the movable member. The resistance applying member is connected between the movable member and the chain guide member. The resistance applying member includes pivot base, first engagement member and second engagement member. The pivot base includes pivot part and pressing part. The pressing part extends radially outwardly from the pivot part. The first engagement member is pivoted to the pivot part and pressed by the pressing part. The second engagement member is engageable with the first engagement member so that the first engagement member is only rotatable with respect to the second engagement member in a rotatable direction.

18 Claims, 9 Drawing Sheets

BICYCLE DERAILLEUR

TECHNICAL FIELD

The disclosure relates to a bicycle transmission device, more particularly to a bicycle derailleur with rotation resistance.

BACKGROUND

A typical bicycle derailleur transmission includes a plurality of sprockets that rotate together with a front crank or with a rear wheel, a chain, and a derailleur that selectively shifts the chain among the plurality of sprockets. A typical derailleur includes a base member adapted to be mounted to the bicycle frame, a movable member movably coupled to the base member, and a chain guide coupled to the movable member. The chain guide engages the chain to selectively switch the chain among the plurality of sprockets when the movable member moves relative to the base member.

The chain guide of a rear derailleur ordinarily is rotatably mounted to the movable member and is spring-biased in a clockwise direction so that the chain guide can take up the slack in the chain when the chain engages the smaller-diameter sprockets. However, during rough riding, bumps and shocks may cause the chain to rotate counterclockwise, thereby creating undesirable slack in the chain or causing the chain to fall off the sprockets.

SUMMARY

The present disclosure provides a bicycle derailleur for decreasing the slack in the chain during riding.

One embodiment of the disclosure provides a bicycle derailleur adapted to be disposed to a linkage assembly. The bicycle derailleur includes a movable member, a chain guide member and a resistance applying member. The movable member is configured to be connected to the linkage assembly. The chain guide member is pivoted to the movable member. The resistance applying member is connected between the movable member and the chain guide member. The resistance applying member includes a pivot base, at least one first engagement member and at least one second engagement member. The pivot base includes a pivot part and at least one pressing part. The at least one pressing part extends radially outwardly from the pivot part. The at least one first engagement member is pivoted to the pivot part and pressed by the at least one pressing part. The at least one second engagement member engageable with the at least one first engagement member so that the at least one first engagement member is only rotatable with respect to the at least one second engagement member in a rotatable direction. When the chain guide member is rotated with respect to the movable member in a first direction, both the pivot base and the at least one first engagement member are rotated with respect to the at least one second engagement member in the rotatable direction. When the chain guide member is rotated in a second direction opposite to the first direction, the at least one second engagement member is engaged with the at least one first engagement member so that the at least one second engagement member drives the pivot base and the at least one first engagement member pressed by the at least one pressing part to rotate with respect to each other.

According to the bicycle derailleur as discussed above, since the first engagement member is directly or indirectly pressed by the pressing part of the pivot base, there will be a rotational friction from the first engagement member and the pivot base to resist the rotation of the chain guide member while the first engagement member engaged with the second engagement member is rotated with respect to the pivot base. Therefore, the chain guide member will not rotate too much during riding, so the slack in the chain is decreased, and the chain is prevented from falling out of its position.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
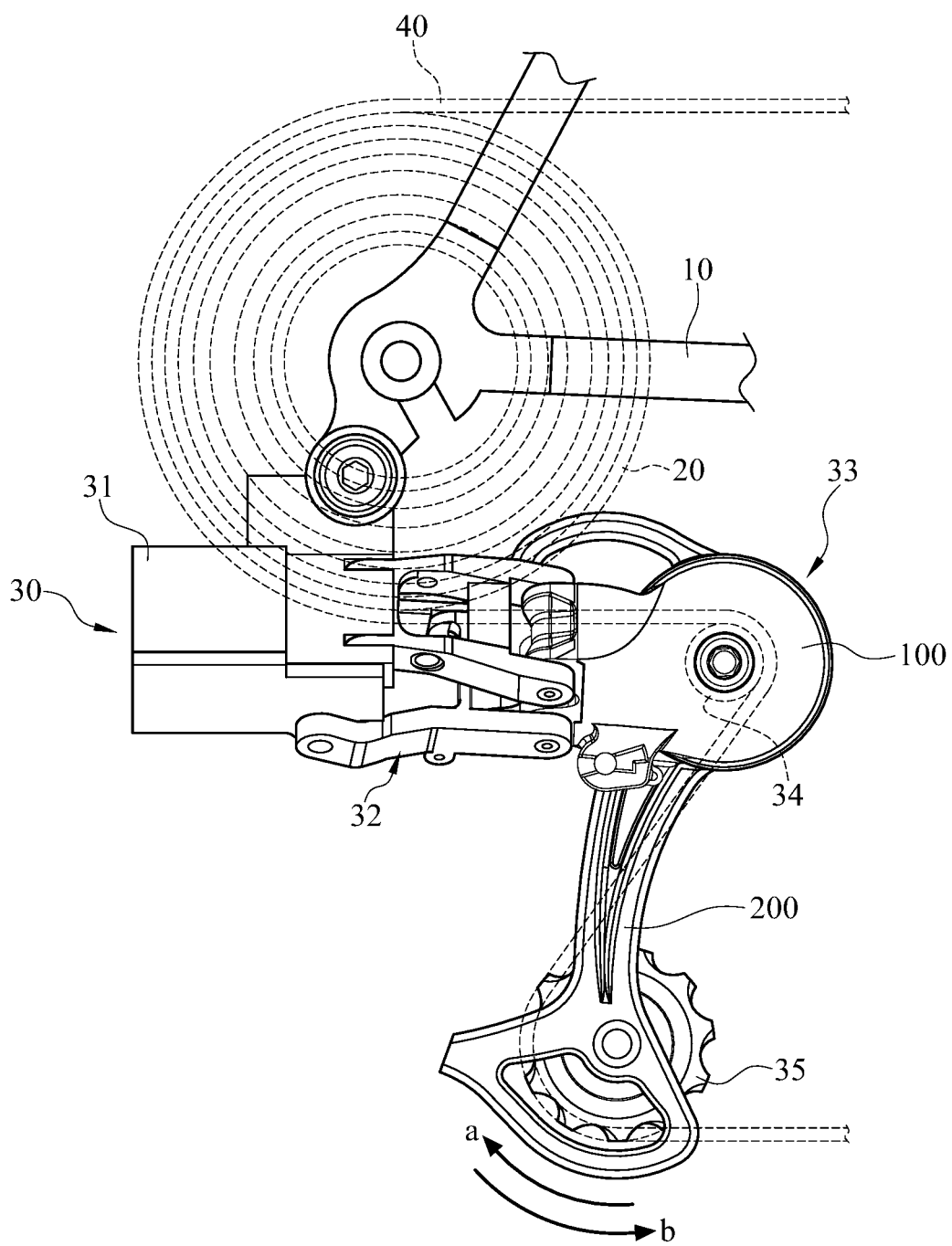
FIG. 1 is a partial enlarged plan view showing a rear part of a bicycle according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a partial enlarged plan view showing a rear part of a bicycle according to a first embodiment of the disclosure. As shown in FIG. 1, a rear part of a bicycle 1 is provided. The rear part of the bicycle 1 includes a bicycle frame 10, a plurality of rear sprockets 20, a rear transmission 30 and a chain 40. The rear sprockets 20 and the rear transmission 30 are disposed on the bicycle frame 10. The rear transmission 30 includes a driving member 31, a linkage assembly 32, a bicycle derailleur 33, a chain roller 34 and a tension pulley 35. The driving member 31 is, for example, a deceleration gear motor. The chain roller 34 and the tension pulley 35 are disposed on the bicycle derailleur 33. The tension pulley 35 can be rotated with respect to the chain roller 34 by the bicycle derailleur 33. The chain 40 is engaged with the chain roller 34, the tension pulley 35 and one of the rear sprockets 20. The driving member 31 can drive the linkage assembly 32 to move the chain roller 34 for shifting the engaged chain 40 from sprocket to sprocket.

Figure 2:
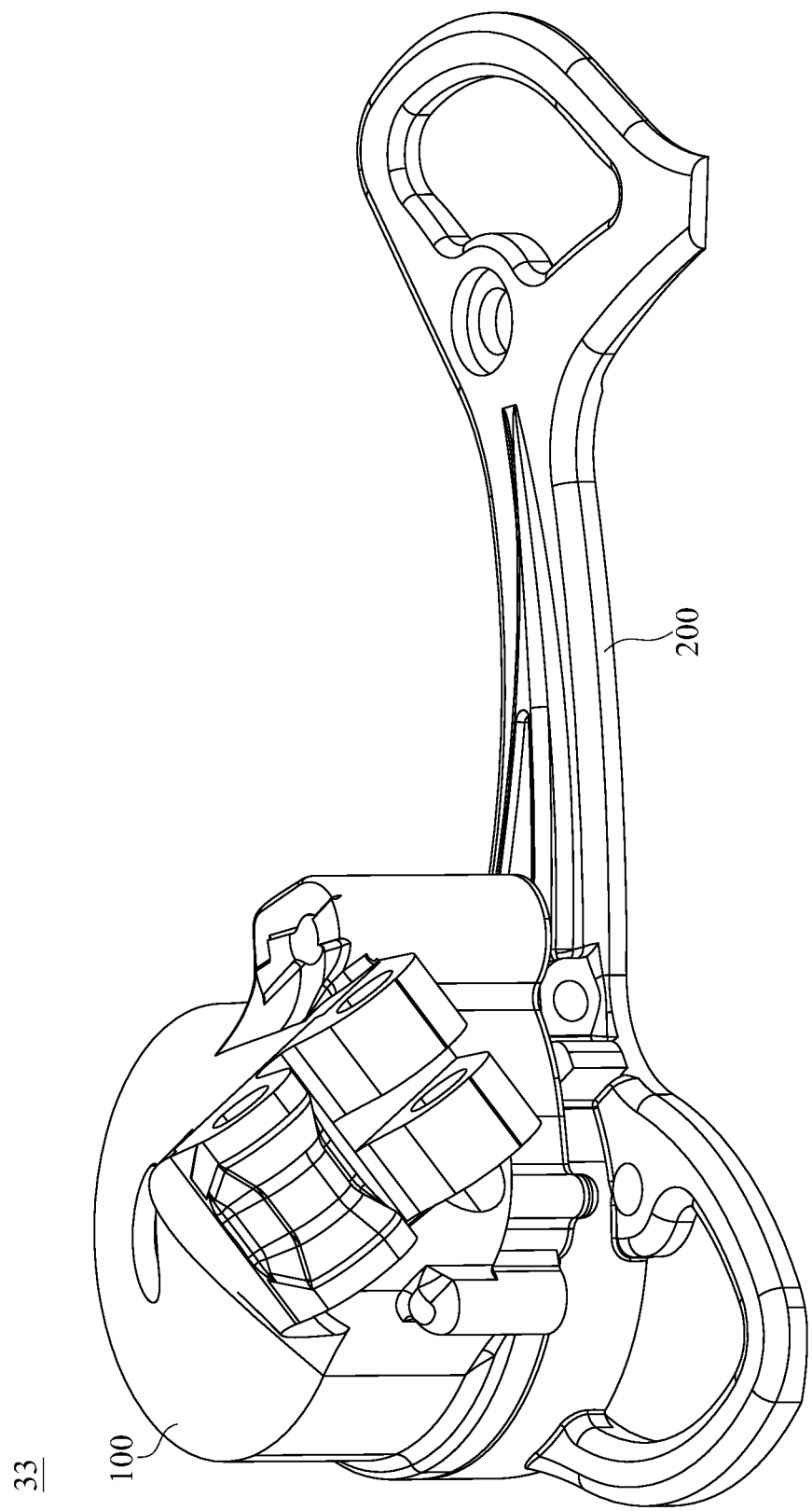
FIG. 2 is a perspective view of a bicycle derailleur in FIG. 1.
Figure 3:
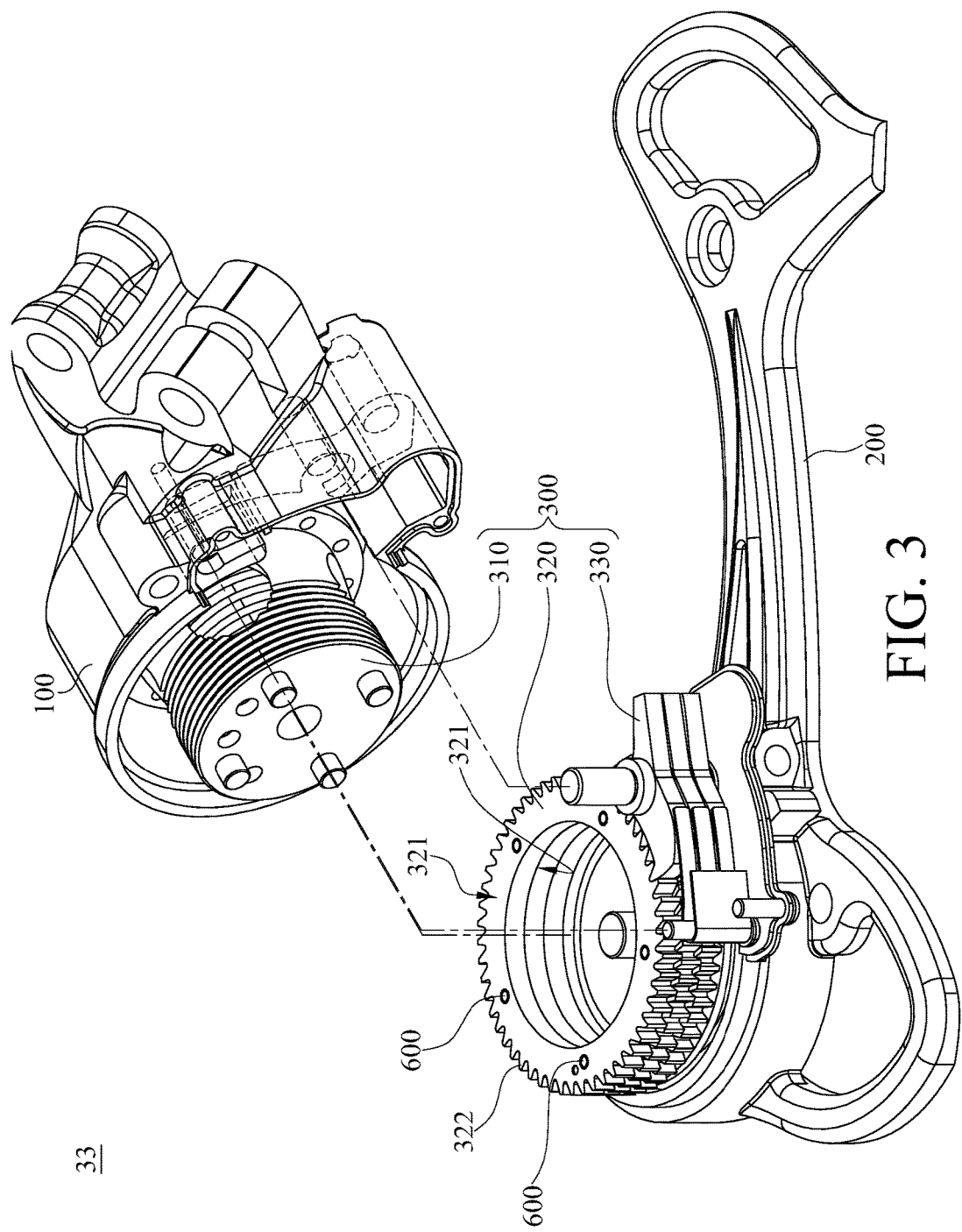
FIG. 3 is an exploded view of the bicycle derailleur in FIG. 2.
Figure 4:
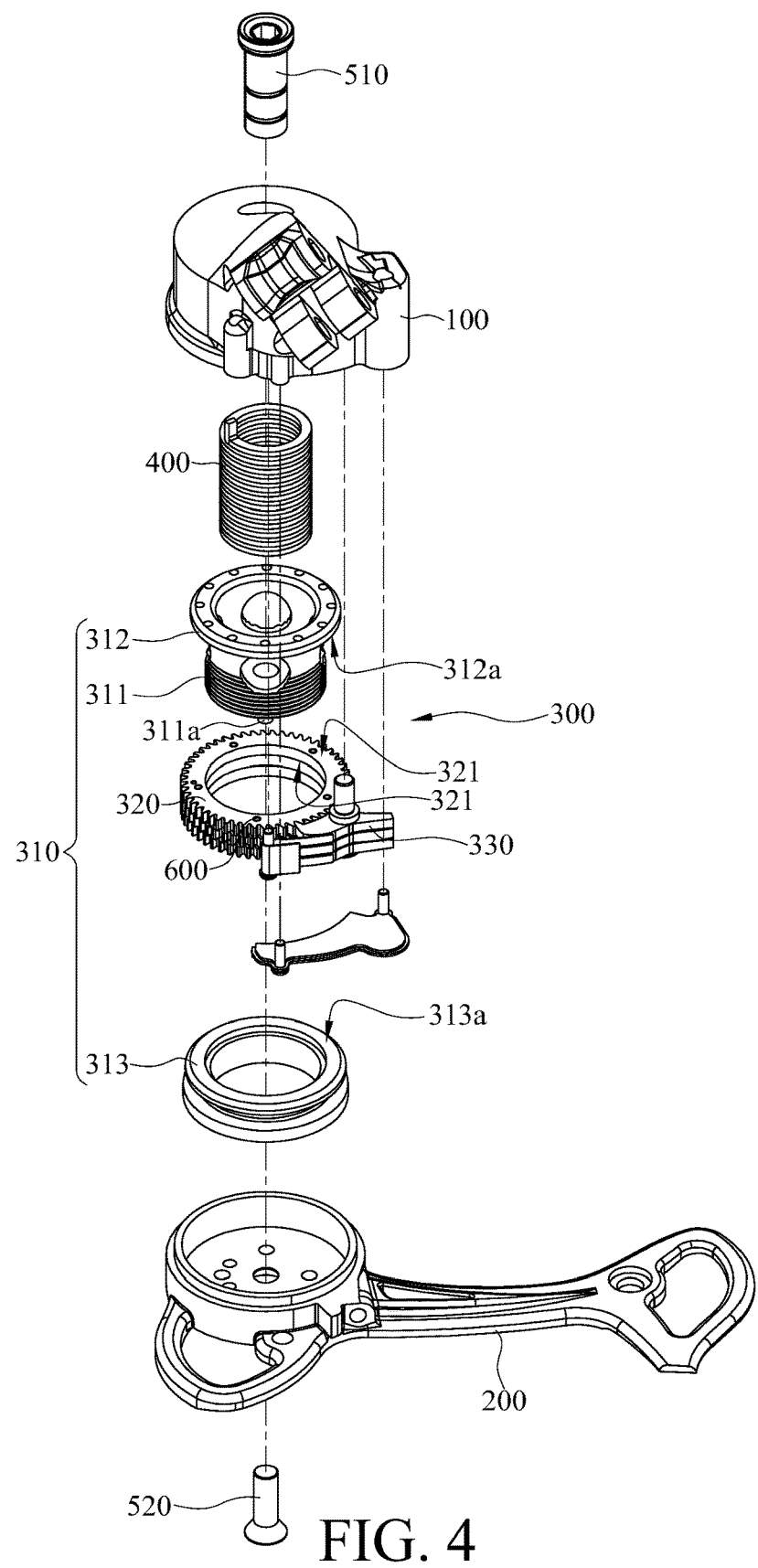
FIGS. 4-5 are more detailed exploded views of the bicycle derailleur in FIG. 2 taken from different viewpoints.
Figure 5:
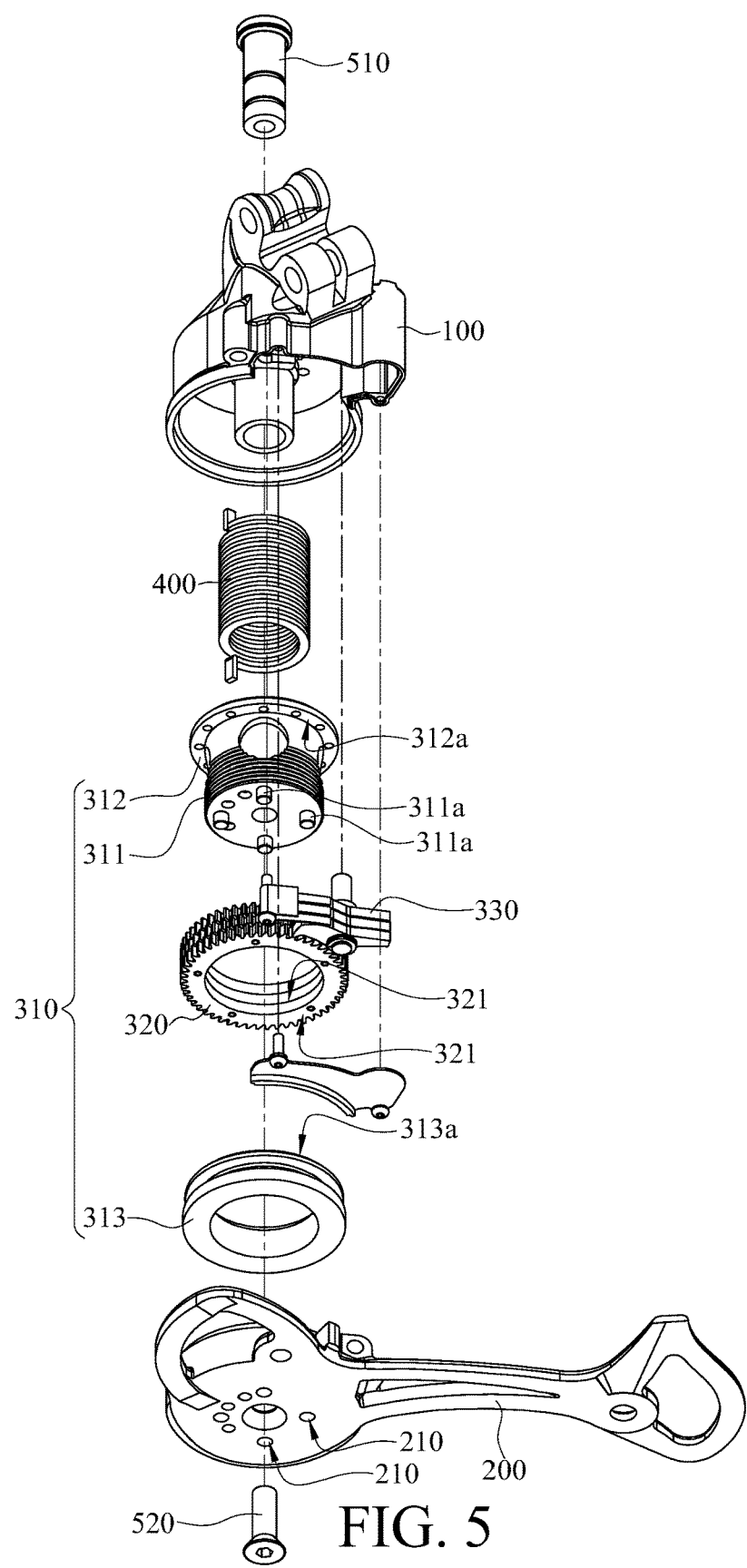

Please refer to FIGS. 2-5, FIG. 2 is a perspective view of a bicycle derailleur in FIG. 1, FIG. 3 is an exploded view of the bicycle derailleur in FIG. 2, and FIGS. 4-5 are more detailed exploded views of the bicycle derailleur in FIG. 2 taken from different viewpoints.

The bicycle derailleur 33 includes a movable member 100, a chain guide member 200 and a resistance applying member 300. In addition, the bicycle derailleur 33 further includes a coil spring 400, a first connection pin 510 and a second connection pin 520.

The movable member 100 is connected to the linkage assembly 32, so the movable member 100 can be moved by the linkage assembly 32.

The chain guide member 200 is pivoted to the movable member 100, and the chain guide member 200 can be rotated in a direction of arrow a or a direction of arrow b (as shown in FIG. 1) with respect to the movable member 100. In detail, the first connection pin 510 and the second connection pin 520 respectively penetrate through the movable member 100 and the chain guide member 200, and the first connection pin 510 and the second connection pin 520 are screwed to each other. Thus, the chain guide member 200 is pivoted to the movable member 100 by being pivoted on the combination of the first connection pin 510 and the second connection pin 520.

The resistance applying member 300 is connected between the movable member 100 and the chain guide member 200. In detail, the resistance applying member 300 includes a pivot base 310, a plurality of first engagement members 320 and a plurality of second engagement members 330.

The pivot base 310 includes a pivot part 311, a first pressing part 312 and a second pressing part 313.

The pivot part 311 has a plurality of first positioning parts 311a. The chain guide member 200 has a plurality of second positioning parts 210. The configurations of the first positioning parts 311a respectively match that of the second positioning parts 210. In detail, in this embodiment, each of the first positioning parts 311a is a protrusion, and each of the second positioning parts 210 is a hole matching the said protrusion. However, the present disclosure is not limited to the configurations of the first positioning parts 311a and the second positioning parts 210. In other embodiments, each of the first positioning parts 311a can be a hole, and each of the second positioning parts 210 can be a protrusion matching the said hole.

The first positioning part 311a and the second positioning parts 210 can be respectively fixed together so that the pivot base 310 and the chain guide member 200 can be fixed and rotated together.

The first pressing part 312 and the second pressing part 313 are respectively located on two sides of the pivot part 311 which are opposite to each other. The first pressing part 312 extends radially outwardly from the pivot part 311, and the first pressing part 312 and the pivot part 311 are integrated into one piece. The second pressing part 313 is fixed to the pivot part 311 by, for example, screwing, so the second pressing part 313 can be moved in the axial direction of the pivot part 311 to move close to or away from the first pressing part 312 by being rotated with respect to the pivot part 311. That is, the second pressing part 313 can be screwed or unscrewed to move close to or away from the first pressing part 312.

In addition, in this embodiment, the first pressing part 312 and the pivot part 311 are integrated into one piece, but the present disclosure is not limited thereto. In other embodiments, the first pressing part 312 and the pivot part 311 are two independent objects, and both the first pressing part 312 and the second pressing part 313 are fixed to the pivot part 311 by screwing. In yet another embodiment, the first pressing part 312 is screwed to the pivot part 311, but the second pressing part 313 and the pivot part 311 are integrated into one piece.

In addition, in this embodiment, the quantity of the first pressing part 312 is one, and the first pressing part 312 is a ring-shaped structure surrounding the pivot part 311, but the present disclosure is not limited thereto. In other embodiments, the first pressing part 312 can be plural in number, and the plurality of first pressing parts 312 are arranged circumferentially around the pivot part 311.

In this embodiment, each first engagement member 320 is, for example, a ratchet wheel which is a round gear with angled teeth. In detail, each of the first engagement members 320 has two opposite side surfaces 321, and each first engagement member 320 has teeth 322. In each first engagement member 320, the teeth 322 radially surround the circumference of the round part of the first engagement member 320, and are located between the two opposite side surfaces 321. In more detail, the tooth 322 has a moderate slope on one edge and a steeper slope one the other edge.

The pivot part 311 of the pivot base 310 penetrates through the first engagement members 320 so that the first engagement members 320 are pivoted on the pivot part 311. The first engagement members 320 are clamped between the first pressing part 312 and the second pressing part 313. That is, the outer side surfaces 321 of the two outermost first engagement members 320 are directly pressed by the first pressing part 312 and the second pressing part 313, respectively. However, the present disclosure is not limited thereto, in other embodiments, the two outermost first engagement members 320 can be respectively indirectly pressed by the first pressing part 312 and the second pressing part 313. In such a case, there can be two gaskets respectively directly disposed on two opposite sides of the first engagement members 320.

In this embodiment, the first pressing part 312 has a first rough surface 312a. The first rough surface 312a faces the second pressing part 313 and presses against the first engagement member 320 which is closest to the first pressing part 312. In addition, the second pressing part 313 has a second rough surface 313a. The second rough surface 313a faces the first pressing part 312 and presses against the first engagement member 320 which is closest to the second pressing part 313. In addition, the rough surfaces 312a and 313a each has, for example, many tiny and rigid protrusions or many small holes, so the surface roughness of the rough surfaces 312a and 313a are greater than that of a smooth surface. Therefore, the rough surfaces 312a and 313a can increase friction between the first pressing part 312 and the first engagement members 320 and between the first engagement members 320 and the second pressing part 313, so there will be a high rotational friction between the pivot base 310 and the first engagement members 320 while the pivot base 310 and the first engagement members 320 are rotated with respect to each other. Furthermore, the rotational friction between the first engagement members 320 and the pivot base 310 can be adjusted by screwing or unscrewing the second pressing part 313.

In addition, the present disclosure is not limited to the first rough surface 312a and the second rough surface 313a. In other embodiments, the first rough surface 312a of the first pressing part 312 and the second rough surface 313a of the second pressing part 313 can be respectively replaced with two smooth surfaces.

In this embodiment, the bicycle derailleur 33 includes a plurality of fixing members 600 penetrating through the first engagement members 320, so the first engagement members 320 can be rotated in unison, but the present disclosure is not limited thereto. In other embodiments, there is no fixing member 600 penetrating through the first engagement members 320, and the first engagement members 320 can be rotated with respect to one another.

Figure 6:
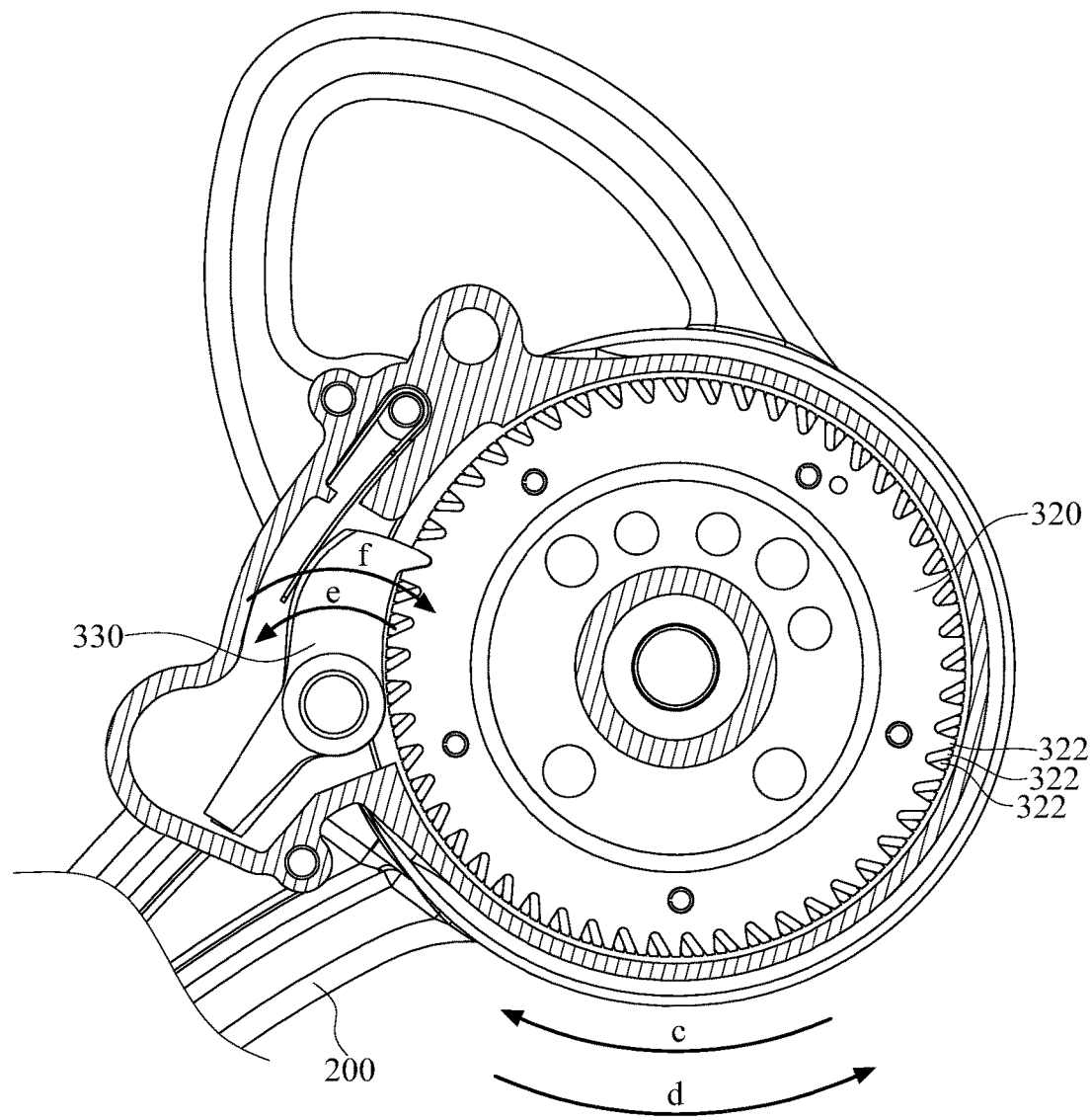
FIG. 6 is a partial cross-sectional view of the bicycle derailleur in FIG. 2.

In addition, please refer to FIG. 6, which is a partial cross-sectional view of the bicycle derailleur in FIG. 2. The teeth 322 on adjacent first engagement members 320 can be aligned or misaligned next to each other. The phrase "aligned next to each other" means that an orthographic projection of the teeth 322 of one of the first engagement members 320 on adjacent first engagement members 320 completely overlaps the other teeth 322. The phrase "misaligned next to each other" means that an orthographic projection of the teeth 322 of one of the first engagement members 320 on adjacent first engagement members 320 partially overlaps the other teeth 322. In this embodiment, the teeth 322 on adjacent first engagement members 320 are misaligned next to each other, but the present disclosure is not limited thereto.

Furthermore, as shown in FIG. 6, each second engagement member 330 is, for example, a pawl. The second engagement members 330 are disposed on the movable member 100. The second engagement members 330 respectively correspond to the first engagement members 320. Each of the second engagement members 330 is engagable with the respective first engagement member 320. In detail, when the teeth 322 are moved in the unrestricted direction (e.g. a rotatable direction as indicated by arrow c), the second engagement member 330 easily slides up and over the gently sloped edges of the teeth 322, with a spring (not numbered) forces it into the depression between the teeth as it passes the tip of each tooth. When the teeth 322 move in the opposite direction (e.g. the direction of arrow d), the second engagement member 330 will catch against the steeply sloped edge of the first tooth 322 it encounters, thereby locking it against the tooth 322 and preventing any further motion in that direction. That is, each first engagement member 320 is permitted rotated in one direction only (i.e. rotatable direction), and will be caught by the respective second engagement member 330 when rotating in the other direction.

Moreover, since the teeth 322 on adjacent first engagement members 320 are misaligned next to each other, the second engagement members 330 will not engage with or disengage from the respective first engagement members 320 at the same time. Therefore, there is less chance that all the second engagement members 330 will disengage from the first engagement members 320 at the same time. In detail, in this embodiment, at least one of the second engagement members 330 is engaged with the respective first engagement member 320.

Please refer back to FIGS. 4-5. One end of the coil spring 400 is fixed to the movable member 100, and another end of the coil spring 400 is fixed to the chain guide member 200. The coil spring 400 constantly forces the chain guide member 200 to rotate with respect to the movable member 100 in a first direction as indicated by arrow a. Therefore, the chain guide member 200 can force the tension pulley 35 to rotate in the first direction by the coil spring 400. Hence, the chain 40 is tighten and prevented from falling out of its position. In addition, in this embodiment, one end of the coil spring 400 is directly fixed to the movable member 100, and another end of the coil spring 400 is fixed to the chain guide member 200 via the pivot base 310, but the present disclosure is not limited thereto.

Please refer back to FIGS. 1 and 6. By the elastic force of the coil spring 400, the chain guide member 200 is forced to move with respect to the movable member 100 in the first direction as indicated by arrow a so that the chain guide member 200 can drive both the pivot base 310 and the first engagement members 320 to rotate in the direction of arrow c (i.e. the rotatable direction). When the first engagement members 320 are rotated in the direction of arrow c with respect to the second engagement members 330, the teeth 322 of the first engagement member 320 push the respective second engagement member 330 to slide up in a direction of arrow e so that the first engagement member 320 and the second engagement member 330 are disengaged from each other for allowing the first engagement member 320 to rotate with respect to the second engagement member 330 in the direction of arrow c. In such a case, the first engagement member 320 interacts with the pivot base 310 in one direction.

When the bicycle is ridding on rough terrain, the chain guide member 200 is likely to swing and rotate with respect to the movable member 100 in a second direction as indicated by arrow b. In such a case, the chain guide member 200 may force the first engagement members 320 to rotate in the direction of arrow d, but the disengaged second engagement members 330 will rotate in a direction of arrow f to catch against the steeply sloped edges of the teeth 322 and engage with the respective first engagement members 320 again. Therefore, the second engagement members 330 can stop the first engagement members 320 to move in the direction of arrow d, and the chain guide member 200 still can drive the pivot base 310 to rotate with respect to the second engagement members 330 in the direction of arrow d. Hence, the pivot base 310 can be rotated with respect to the first engagement members 320 when the chain guide member 200 is rotated in the second direction, and there will be a rotational friction between the first pressing part 312 and the first engagement members 320 and between the first engagement members 320 and the second pressing part 313 which is greater than that when the chain guide member 200 is rotated with respect to the movable member 100 in the first direction (i.e. the direction of arrow a). Therefore, when the chain guide member 200 is rotated in the second direction, there will be a frictional resistance from the pivot base 310 and the first engagement members 320 to resist the chain guide member 200 to move too much in the second direction. Accordingly, the chain 40 moved with the chain guide member 200 can be still maintained in place, so the slack in the chain 40 is decreased, and the chain 40 is prevented from falling out of its position.

Furthermore, in this embodiment, both the quantity of the first engagement members 320 and the quantity of the second engagement members 330 are three, but the present disclosure is not limited thereto. In other embodiments, both the quantity of the first engagement member 320 and the quantity of the second engagement member 330 can be one.

Figure 7:
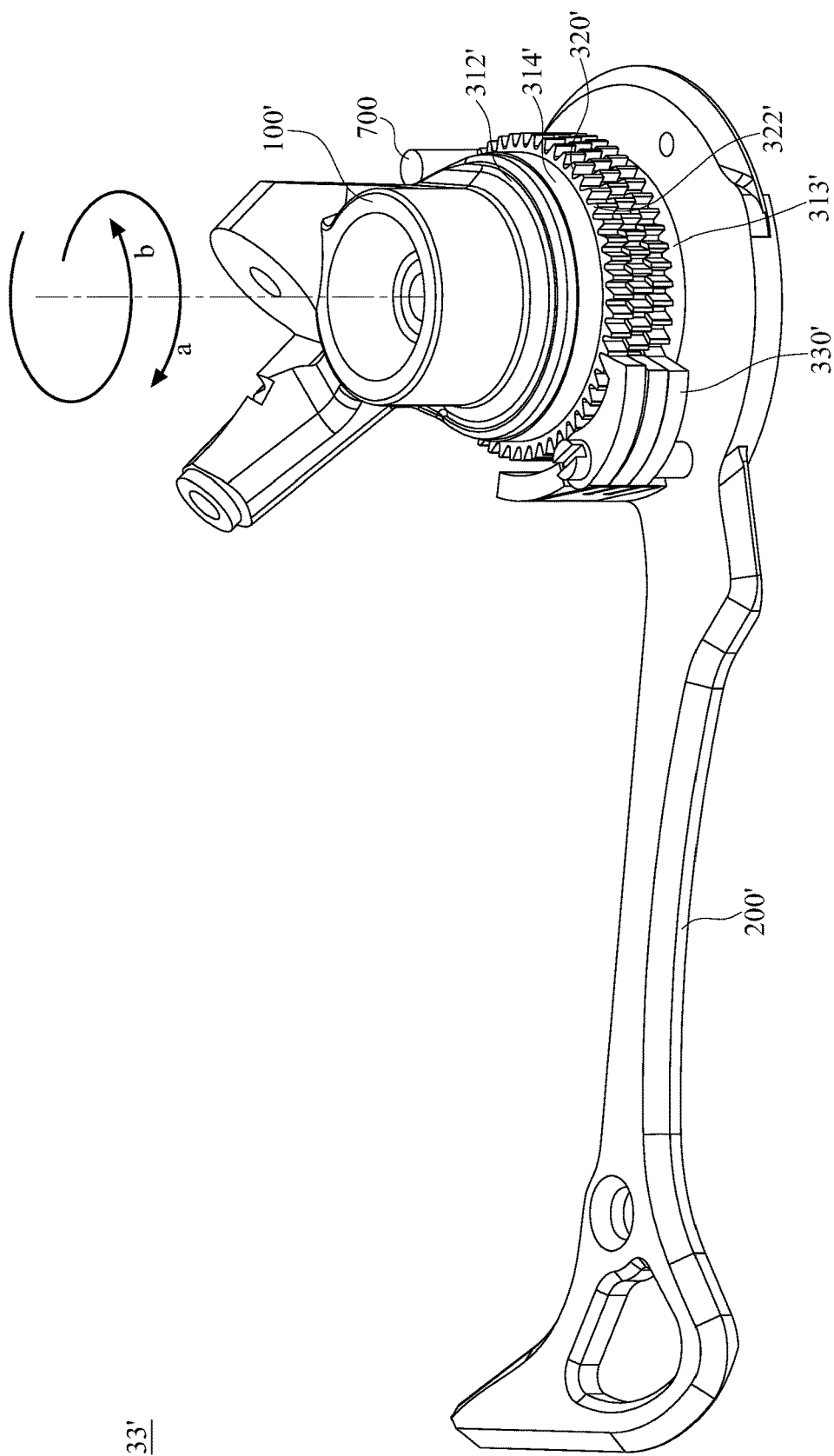
FIG. 7 is a perspective view of a bicycle derailleur according to a second embodiment of the disclosure.
Figure 8:
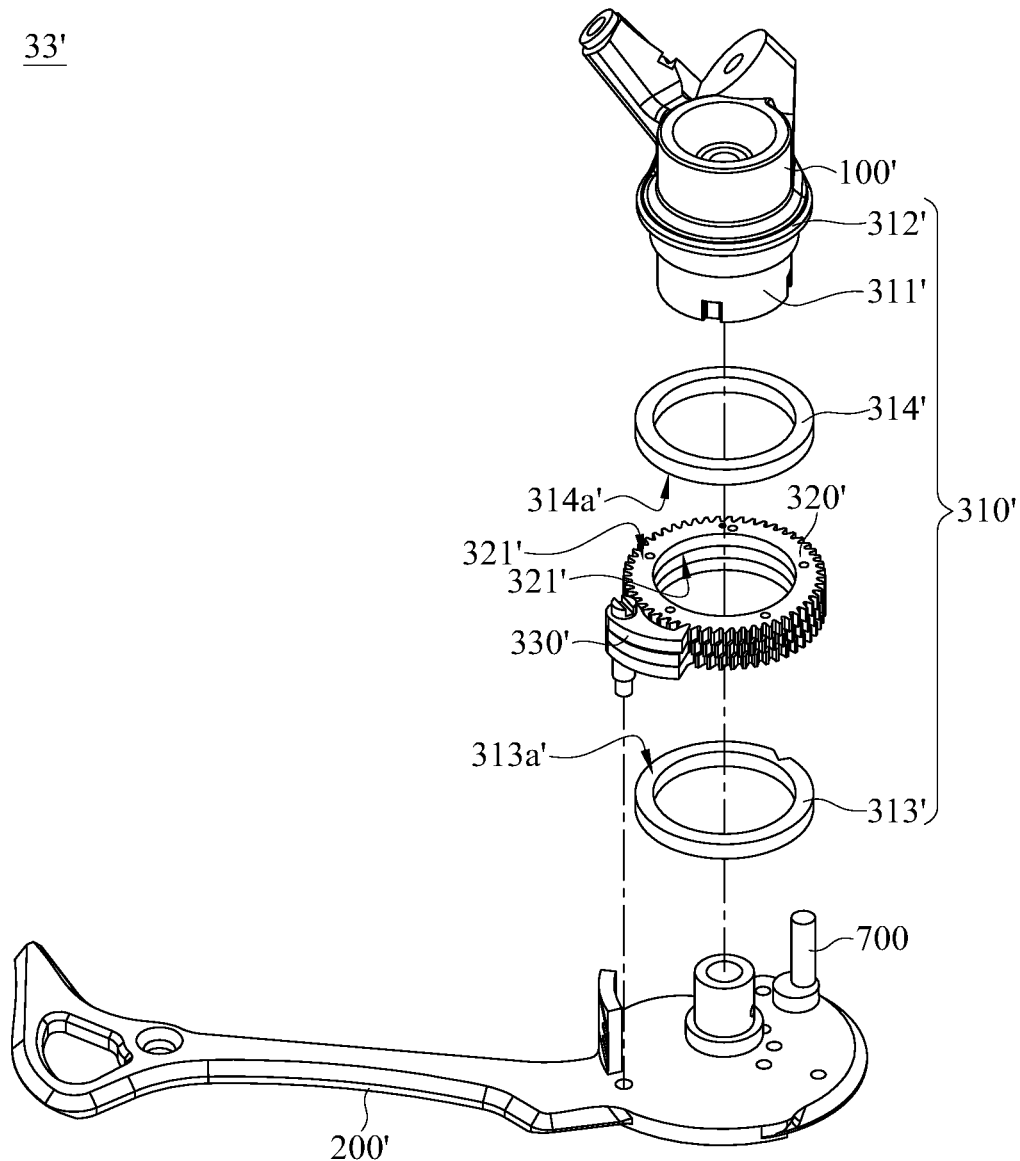
FIG. 8 is an exploded view of the bicycle derailleur in FIG. 7.
Figure 9:
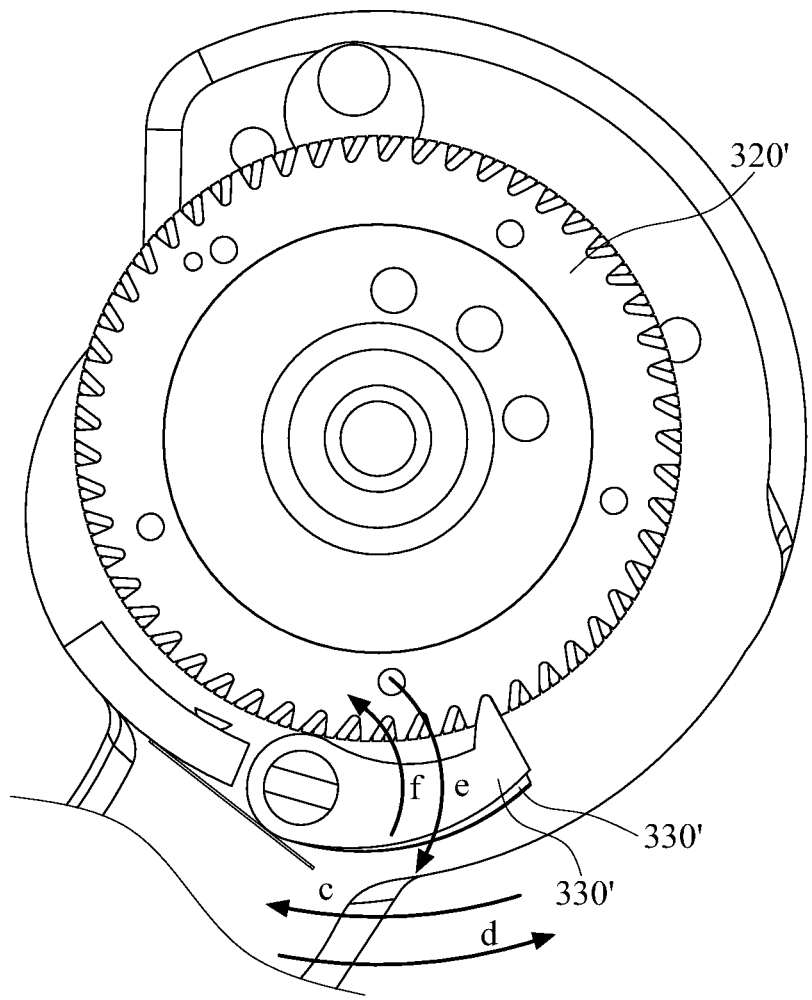
FIG. 9 is a partial cross-sectional view of the bicycle derailleur in FIG. 7.

Please refer to FIGS. 7-9, FIG. 7 is a perspective view of a bicycle derailleur according to a second embodiment of the disclosure, FIG. 8 is an exploded view of the bicycle derailleur in FIG. 7, and FIG. 9 is a partial cross-sectional view of the bicycle derailleur in FIG. 7.

In this embodiment, a bicycle derailleur 33' is provided. The bicycle derailleur 33' includes a movable member 100', a chain guide member 200' and a resistance applying member 300'.

The chain guide member 200' is pivoted to the movable member 100', so the chain guide member 200' can be rotated with respect to the movable member 100' in a direction of arrow a or a direction of arrow b (as shown in FIG. 7).

The resistance applying member 300' is connected between the movable member 100' and the chain guide member 200'. In detail, the resistance applying member 300' includes a pivot base 310, a plurality of first engagement members 320' and a plurality of second engagement members 330'.

The pivot base 310' includes a pivot part 311', a first pressing part 312', a second pressing part 313' and a gasket 314'.

The pivot part 311', the first pressing part 312' and the movable member 100' are integrated into one piece, so the pivot base 310' and the movable member 100' can be moved together. However, the present disclosure is not limited thereto. In other embodiments, the pivot part 311' and the first pressing part 312' are integrated into one piece, but the first pressing part 312' is fixed to the movable member 100' by screwing.

The second pressing part 313' is located on a side of the pivot part 311' which is away from the first pressing part 312'. The second pressing part 313' is fixed to the pivot part 311' by, for example, screwing, so the second pressing part 313' can be moved in the axial direction of the pivot part 311' to move close to or away from the first pressing part 312' by being rotated with respect to the pivot part 311'. That is, the second pressing part 313' can be screwed or unscrewed to move close to or away from the first pressing part 312'.

In addition, in this embodiment, the first pressing part 312' and the pivot part 311' are integrated into one piece, but the present disclosure is not limited thereto. In other embodiments, the first pressing part 312' and the pivot part 311' can be two independent objects which are fixed to each other by screwing.

The gasket 314' is a ring-shaped structure. The gasket 314' is placed on the pivot part 311' and located between the first pressing part 312' and the second pressing part 313'. In this embodiment, the quantity of the gasket 314' is one, but the present disclosure is not limited thereto. In other embodiments, the gasket 314' can be plural in number.

In this embodiment, each first engagement member 320' is, for example, a ratchet wheel which is a round gear with angled teeth. In detail, each first engagement member 320' has two opposite side surfaces 321' and teeth 322'. In each first engagement member 320', the teeth 322' radially surround the circumference of the round part of the first engagement member 320', and are located between the two opposite side surfaces 321'. In more detail, the tooth 322' has a moderate slope on one edge and a steeper slope one the other edge.

The pivot part 311' of the pivot base 310' penetrates through the first engagement members 320' so that the first engagement members 320' are pivoted on the pivot part 311'. The first engagement members 320' are clamped between the gasket 314' and the second pressing part 313'. That is, the outer side surfaces 321' of the two outermost first engagement members 320' are directly pressed by the gasket 314' and the second pressing part 313', respectively.

In this embodiment, the gasket 314' has a first rough surface 314a'. The first rough surface 314a' faces the second pressing part 313 and presses against the first engagement member 320' which is closest to the first pressing part 312. The second pressing part 313' has a second rough surface 313a'. The second rough surface 313a' faces the first pressing part 312 and presses against the first engagement member 320' which is closest to the second pressing part 313'. In addition, the rough surfaces 314a' and 313a' each has, for example, many tiny and rigid protrusions or many small holes, so the surface roughness of the rough surfaces 314a' and 313a' are greater than that of a smooth surface. Therefore, the rough surfaces 314a' and 313a' can increase friction between the gasket 314' and the first engagement members 320' and between the second pressing part 313' and the first engagement members 320', so there will be a high rotational friction between the pivot base 310' and the first engagement members 320' while the pivot base 310' and the first engagement members 320' are rotated with respect to each other. Furthermore, the rotational friction between the first engagement members 320' and the pivot base 310' can be adjusted by screwing or unscrewing the second pressing part 313'.

In addition, the present disclosure is not limited to the first rough surface 314a' and the second rough surface 313a'. In other embodiments, the first rough surface 314a' and the second rough surface 313a' can be respectively replaced with two smooth surfaces.

In this embodiment, the resistance applying member 300' includes an adjusting member 700 configured for adjusting the pressure between the second pressing part 313' and the first engagement members 320'. In detail, the adjusting member 700 has a protrusion (not numbered), and the second pressing part 313' has a notch (not numbered) fixed to the said protrusion on the adjusting member 700. When the adjusting member 700 is moved with the chain guide member 200', the said protrusion on the adjusting member 700 can drive the second pressing part 313' to rotate for adjusting the distance between the second pressing part 313' and the first pressing part 312', thereby adjusting the pressure between the second pressing part 313' and the first engagement members 320' and between the first pressing part 312' and the first engagement members 320'. However, the present disclosure is not limited to the configuration of adjusting member 700. In other embodiments, the adjusting member 700 can have a worm, and the second pressing part 313' can be a worm wheel.

In addition, as shown in FIG. 9, the teeth 322' on adjacent first engagement members 320' can be aligned or misaligned next to each other. The phrase "aligned next to each other" means that an orthographic projection of the teeth 322' of one of the first engagement member 320' on adjacent first engagement members 320 completely overlaps the other teeth 322'. The phrase "misaligned next to each other" means that an orthographic projection of the teeth 322' of one of the first engagement members 320' on adjacent first engagement members 320' partially overlaps the other teeth 322'. In this embodiment, the teeth 322' on adjacent first engagement members 320 are misaligned next to each other, but the present disclosure is not limited thereto.

Each second engagement member 330' is, for example, a pawl. The second engagement members 330' are disposed on the chain guide member 200', so the second engagement members 330' are moved with the chain guide member 200'. The second engagement members 330' respectively correspond to the first engagement members 320'. Each of the second engagement members 330' is engagable with the respective first engagement member 320'. In detail, the first engagement members 320' are only allowed to be rotated with respect to the second engagement members 330' in a rotatable direction as indicated by arrow d, and will be stopped by the second engagement members 330' when rotating in the opposite direction. In other words, the second engagement members 330' are only allowed to be rotated with respect to the first engagement members 320' in the direction of arrow c when being moved with the chain guide member 200'.

Please refer back to FIGS. 7 and 9. When the chain guide member 200' is rotated with respect to the movable member 100' in a first direction as indicated by arrow a, the chain guide member 200' and the connected second engagement members 330' are rotated with respect to the first engagement members 320' in the direction of arrow c together (i.e. the first engagement members 320' are rotated with respect to the second engagement members 330' and the chain guide member 200' in the rotatable direction as indicated by arrow d). When the second engagement members 330' are rotated with respect to the first engagement members 320' in the direction of arrow c, the teeth 322' of the first engagement member 320' push the respective second engagement member 330' to slide up in a direction of arrow e so that the first engagement member 320 and the second engagement member 330' are disengaged from each other for allowing the second engagement member 330' to rotate with respect to the first engagement member 320' in the direction of arrow c.

When the bicycle is ridding on rough terrain, the chain guide member 200' is likely to swing and rotate with respect to the movable member 100' in a second direction as indicated by arrow b. In such a case, the chain guide member 200' may force the connected second engagement members 330' to rotate in the direction of arrow d, but the disengaged second engagement members 330 will rotate in a direction of arrow f to catch against the steeply sloped edges of the teeth 322' and engage with the respective first engagement members 320 again. Therefore, the second engagement members 330' can drive the first engagement members 320' to rotate with respect to the pivot base 310' in the direction of arrow d together, and there will be a rotational friction between the gasket 314' and the first engagement members 320' and between the second pressing part 313' and the first engagement members 320' which is greater than that when the chain guide member 200' is rotated with respect to the movable member 100' in the first direction (i.e. the direction of arrow a). Therefore, when the chain guide member 200' is rotated in the second direction, there will be a frictional resistance from the pivot base 310' and the first engagement members 320' to resist the chain guide member 200' to move too much in the second direction. Accordingly, the chain 40 moved with the chain guide member 200' can be still maintained in place, so the slack in the chain 40 is decreased, and the chain 40 is prevented from falling out of its position.

According to the bicycle derailleur as discussed above, since the first engagement member is directly or indirectly pressed by the pressing part of the pivot base, there will be a rotational friction from the first engagement member and the pivot base to resist the rotation of the chain guide member while the first engagement member engaged with the second engagement member is rotated with respect to the pivot base. Therefore, the chain guide member will not rotate too much during riding, so the slack in the chain is decreased, and the chain is prevented from falling out of its position.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A bicycle derailleur adapted to be disposed to a linkage assembly, the bicycle derailleur comprising:

a movable member configured to be connected to the linkage assembly;
a chain guide member pivoted to the movable member; and
a resistance applying member connected between the movable member and the chain guide member, the resistance applying member comprising:
  a pivot base comprising a pivot part and at least one pressing part, the at least one pressing part extending radially outwardly from the pivot part;
  at least one first engagement member pivoted to the pivot part and pressed by the at least one pressing part; and
  at least one second engagement member engageable with the at least one first engagement member so that the at least one first engagement member is only rotatable with respect to the at least one second engagement member in a rotatable direction;
wherein, when the chain guide member is rotated with respect to the movable member in a first direction, both the pivot base and the at least one first engagement member are rotated with respect to the at least one second engagement member in the rotatable direction;
when the chain guide member is rotated in a second direction opposite to the first direction, the at least one second engagement member is engaged with the at least one first engagement member so that the at least one second engagement member drives the pivot base and the at least one first engagement member pressed by the at least one pressing part to rotate with respect to each other.

2. The bicycle derailleur according to claim 1, wherein the pivot base is disposed on the chain guide member, the at least one first engagement member is disposed between the at least one pressing part and the chain guide member, and the at least one second engagement member is disposed on the movable member.

3. The bicycle derailleur according to claim 2, wherein the at least one pressing part comprises a first pressing part and a second pressing part, the first pressing part is fixed on a side of the pivot part, the second pressing part is screwed on another side of the pivot part, and the at least one first engagement member is clamped between the first pressing part and the second pressing part.

4. The bicycle derailleur according to claim 3, wherein the first pressing part has a first rough surface facing the second pressing part and pressing against the at least one first engagement member.

5. The bicycle derailleur according to claim 4, wherein the second pressing part has a second rough surface facing the first pressing part and pressing against the at least one first engagement member.

6. The bicycle derailleur according to claim 5, wherein the at least one first engagement member has two side surfaces which are opposite to each other, and the two side surfaces are respectively in contact with the first rough surface and the second rough surface.

7. The bicycle derailleur according to claim 1, further comprising a coil spring connected between the movable member and the chain guide member for constantly forcing the chain guide member to rotate in the first direction with respect to the movable member.

8. The bicycle derailleur according to claim 1, wherein both the at least one first engagement member and the at least one second engagement member are plural in number, and at least one of the second engagement members is engaged with the respective first engagement member.

9. The bicycle derailleur according to claim 1, wherein both the at least one first engagement member and the at least one second engagement member are plural in number, each of the first engagement members has teeth, the teeth on the adjacent first engagement members are misaligned next to each other, the second engagement members are respectively corresponding to the first engagement members, and at least one of the second engagement members is engaged with the respective the first engagement member.

10. The bicycle derailleur according to claim 1, further comprising a first connection pin and a second connection pin, the first connection pin and the second connection pin respectively penetrating through the movable member and the chain guide member, and the first connection pin and the second connection pin screwed together.

11. The bicycle derailleur according to claim 1, wherein the pivot part has a plurality of first positioning parts, the chain guide member has a plurality of second positioning parts, the configurations of the first positioning parts respectively match that of the second positioning parts so that the second positioning parts are respectively fixable to the first positioning parts.

12. The bicycle derailleur according to claim 1, wherein the at least one first engagement member is directly pressed by the at least one pressing part.

13. The bicycle derailleur according to claim 1, wherein the at least one first engagement member is indirectly pressed by the at least one pressing part.

14. The bicycle derailleur according to claim 1, wherein the at least one pressing part comprises a first pressing part and a second pressing part, the first pressing part is fixed on a side of the pivot part, the second pressing part is screwed on another side of the pivot part, the at least one first engagement member is clamped between the first pressing part and the second pressing part.

15. The bicycle derailleur according to claim 14, wherein the pivot base is disposed on the movable member, and the at least one second engagement member is disposed on the chain guide member.

16. The bicycle derailleur according to claim 15, wherein the pivot base and the movable member are integrated into one piece.

17. The bicycle derailleur according to claim 14, wherein the pivot base comprises at lease one gasket placed on the pivot part and located between the first pressing part and the second pressing part.

18. The bicycle derailleur according to claim 1, wherein the resistance applying member comprises an adjusting member corresponding to the at least one pressing part for adjusting the pressure between the at least one pressing part and the at least one first engagement member.

* * * * *